Figure 1:
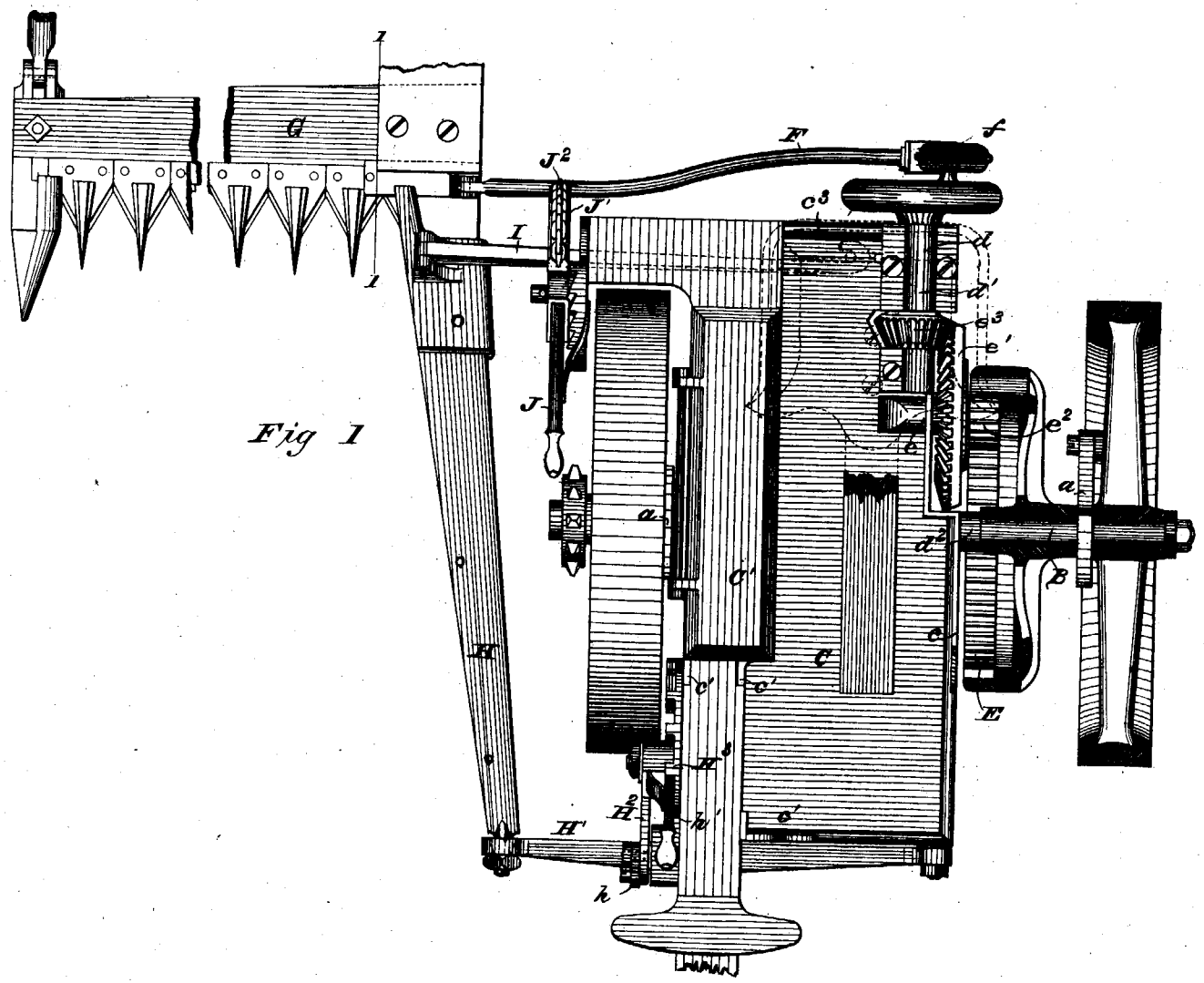

6 Sheets—Sheet 1.

J. S. MARSH.

HARVESTERS.

No. 7,870. Reissued Sept. 4, 1877.

WITNESSES

Wm. A. Skinkle.

F. Stich

INVENTOR

James S Marsh

By his Attorneys

Baldwin, Hopkins & Peyton

N. PETERS, PHOTO-LITHOGRAPHER, WASHINGTON, D. C.

6 Sheets—Sheet 2.

J. S. MARSH.

HARVESTERS.

No. 7,870. Reissued Sept. 4, 1877.

WITNESSES

Wm A. Stickle.

F. Stick

INVENTOR

James S Marsh.

By his Attorneys,

Baldwin Hopkins & Peyton.

N. PETERS, PHOTO-LITHOGRAPHER, WASHINGTON, D. C.

6 Sheets—Sheet 3.

J. S. MARSH.

HARVESTERS.

No. 7,870. Reissued Sept. 4, 1877.

WITNESSES

Wm. A. Skinkle

F. Stich

INVENTOR

James S. Marsh

By his Attorneys,

Baldwin, Hopkins & Peyton

N. PETERS, PHOTO-LITHOGRAPHER, WASHINGTON, D. C.

6 Sheets—Sheet 4.

J. S. MARSH.

HARVESTERS.

No. 7,870. Reissued Sept. 4, 1877.

WITNESSES

Wm. A. Stinkle

F. Otth

INVENTOR,

James S. Marsh.

By his Attorneys,

Baldwin, Hopkins & Peyton

N. PETERS, PHOTO-LITHOGRAPHER, WASHINGTON, D. C.

6 Sheets—Sheet 5.

J. S. MARSH.

HARVESTERS.

No. 7,870. Reissued Sept. 4, 1877.

WITNESSES

Wm. A. Skinkle

Geo. W. Crook

INVENTOR

James S. Marsh.

By his Attorneys.

Baldwin, Hopkins & Peyton.

N. PETERS, PHOTO-LITHOGRAPHER, WASHINGTON, D. C.

J. S. MARSH.
HARVESTERS.

No. 7,870. Reissued Sept. 4, 1877.

WITNESSES

Wm. A. Skinkle

Geo. H. Buck

INVENTOR

James S. Marsh.

By his Attorneys.

Baldwin, Hopkins, & Peyton.

N. PETERS, PHOTO-LITHOGRAPHER, WASHINGTON, D. C.

UNITED STATES PATENT OFFICE.

JAMES S. MARSH, OF LEWISBURG, PENNSYLVANIA.

IMPROVEMENT IN HARVESTERS.

Specification forming part of Letters Patent No. 61,944, dated February 12, 1867; Reissue No. 7,870, dated September 4, 1877; application filed May 21, 1877.

*To all whom it may concern:*

Be it known that I, JAMES S. MARSH, of Lewisburg, in the county of Union and State of Pennsylvania, have invented certain new and useful Improvements in Harvesting-Machines, of which the following is a full, clear, and exact description.

My invention relates to a convertible or combined harvesting-machine—that is, one which can be used either as a reaper or as a mower—of the class known as two-wheeled, hinge-joint, rear-cut harvesters.

The first part of my invention relates to the main frame. Its object is to combine strength and lightness, and to provide supports for the gearing, driver's seat, and tongue, as well as a receptacle for tools; to which end my improvement consists in casting the main frame in one piece with a tool-box, which forms a strengthening-brace, and with recesses or journal-boxes for the shafting, as hereinafter more fully set forth.

The object of the next part of my invention is to enable the driver, while seated upon the machine, readily to rock or roll the finger-beam axially to tip the cutters; to which end my improvement consists in combining a main frame mounted upon two wheels, and carrying a seat for the driver; a finger-beam united to a drag-bar, connected at its forward end with the main frame by a coupling-link; a lateral brace or coupling-arm pivoted to the drag-bar near the shoe; and a lifting-lever pivoted on the main frame between the driving-wheels, moving parallel therewith, and connected with the coupling-link, and provided with a detent, whereby the front end of the drag-bar may be raised, lowered, or locked in any desired position.

The object of the next part of my invention is to enable the driver while riding upon the machine to raise and lower the cutting apparatus, as well as to rock it; to which end my improvement consists in combining a main frame mounted upon two wheels and carrying a seat for the driver; a laterally-projecting cutting apparatus hinged to the main frame, with a lifting apparatus mounted on the rear of the main frame, and another lifting apparatus mounted on the front of the main frame, and linked to a drag-bar, whereby either end of the drag-bar may be raised and lowered as required.

The next part of my invention relates to the platform upon which the grain falls when first cut, its objects being so to connect said platform with the main frame that the driver can, from his seat on the machine, elevate or depress the front end of the grain-platform at pleasure, which end I attain by combining two main supporting and driving wheels, a main frame mounted thereon, a finger-beam connected with the main frame by a hinged drag-bar and coupling-arm, a platform connected with said finger-beam and supported upon caster-wheels, and a rocking lever mounted upon the main frame and connected with the front end of the drag-bar, whereby the driver from his seat can raise or lower the cutting apparatus.

Figure 2:
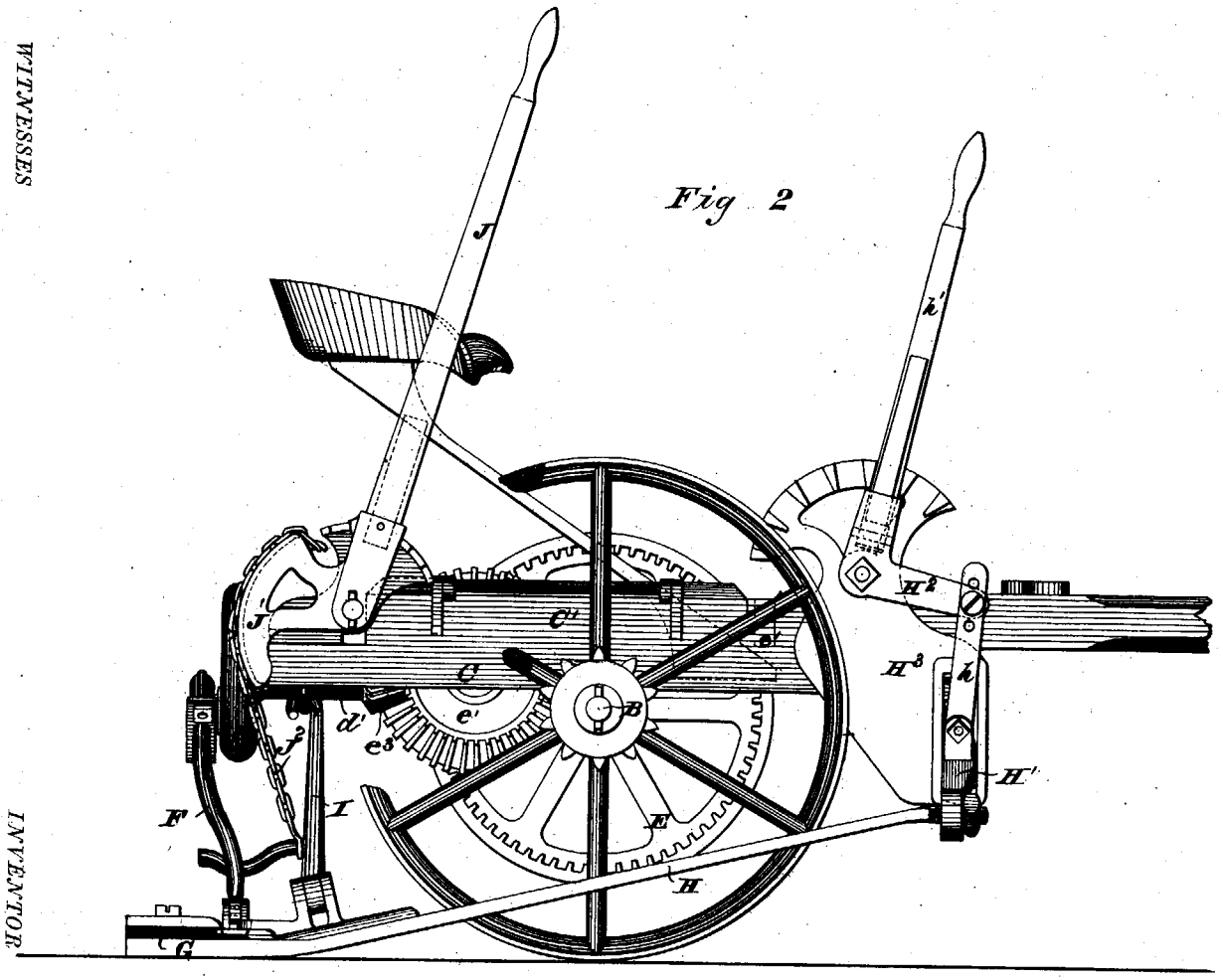
Figure 3:
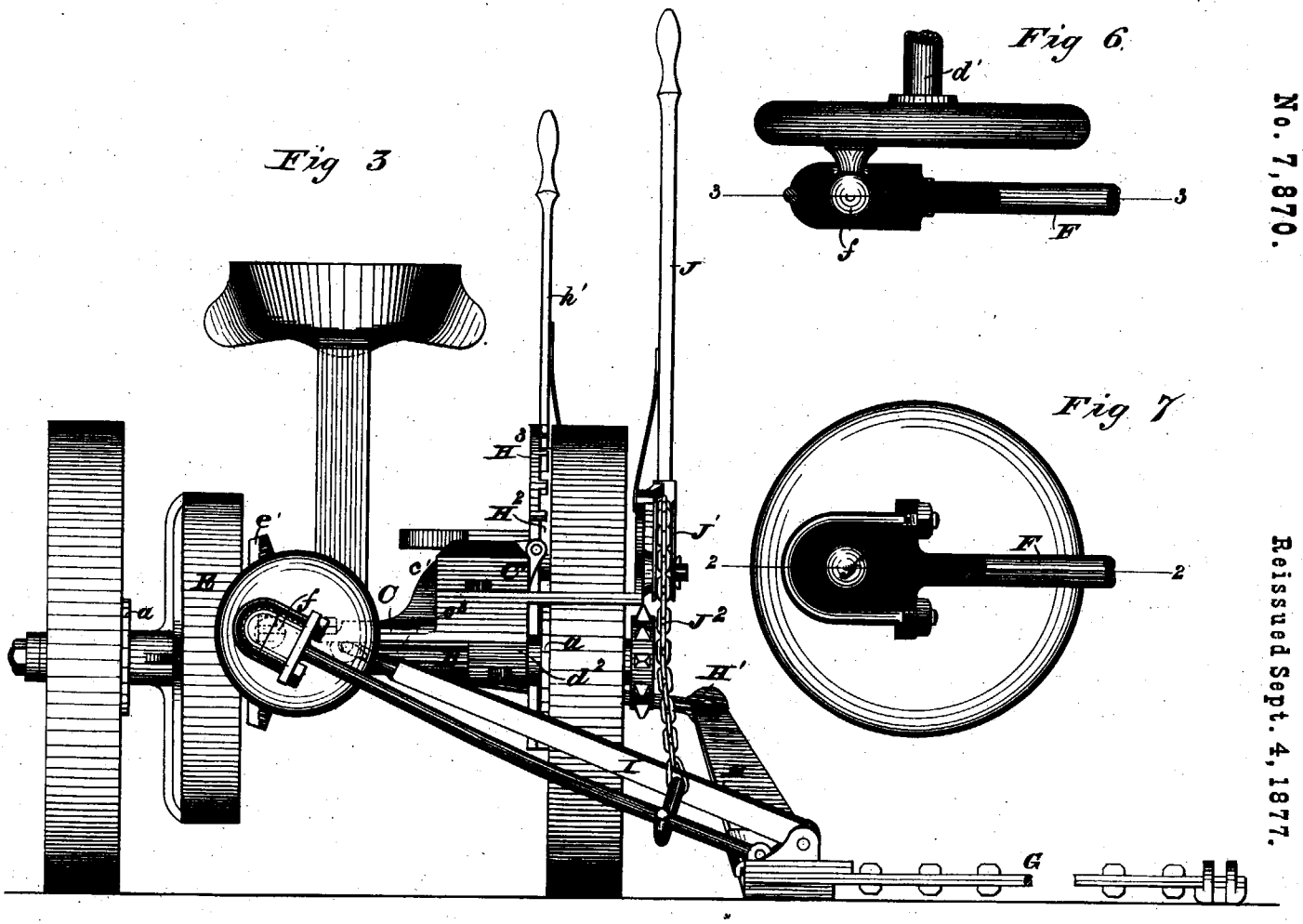
Figure 4:
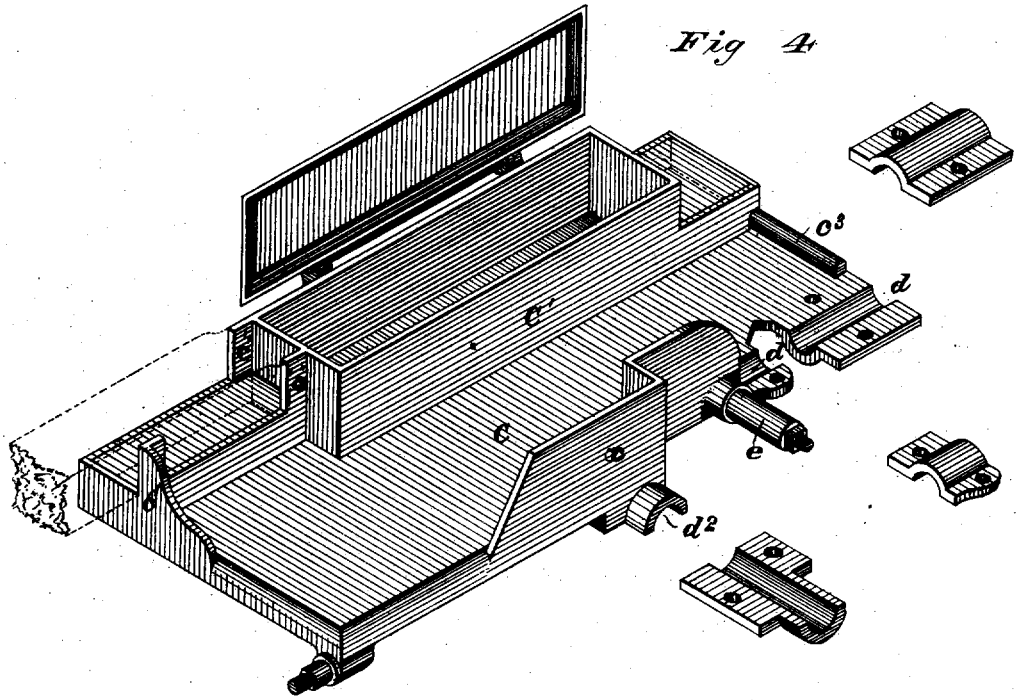
Figure 5:
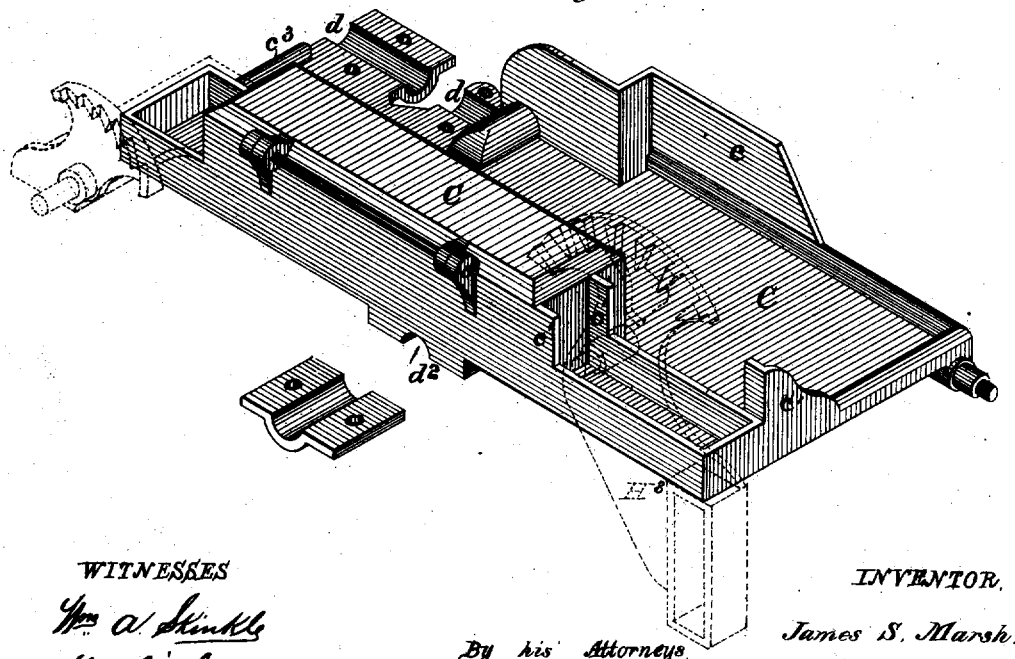
Figure 8:
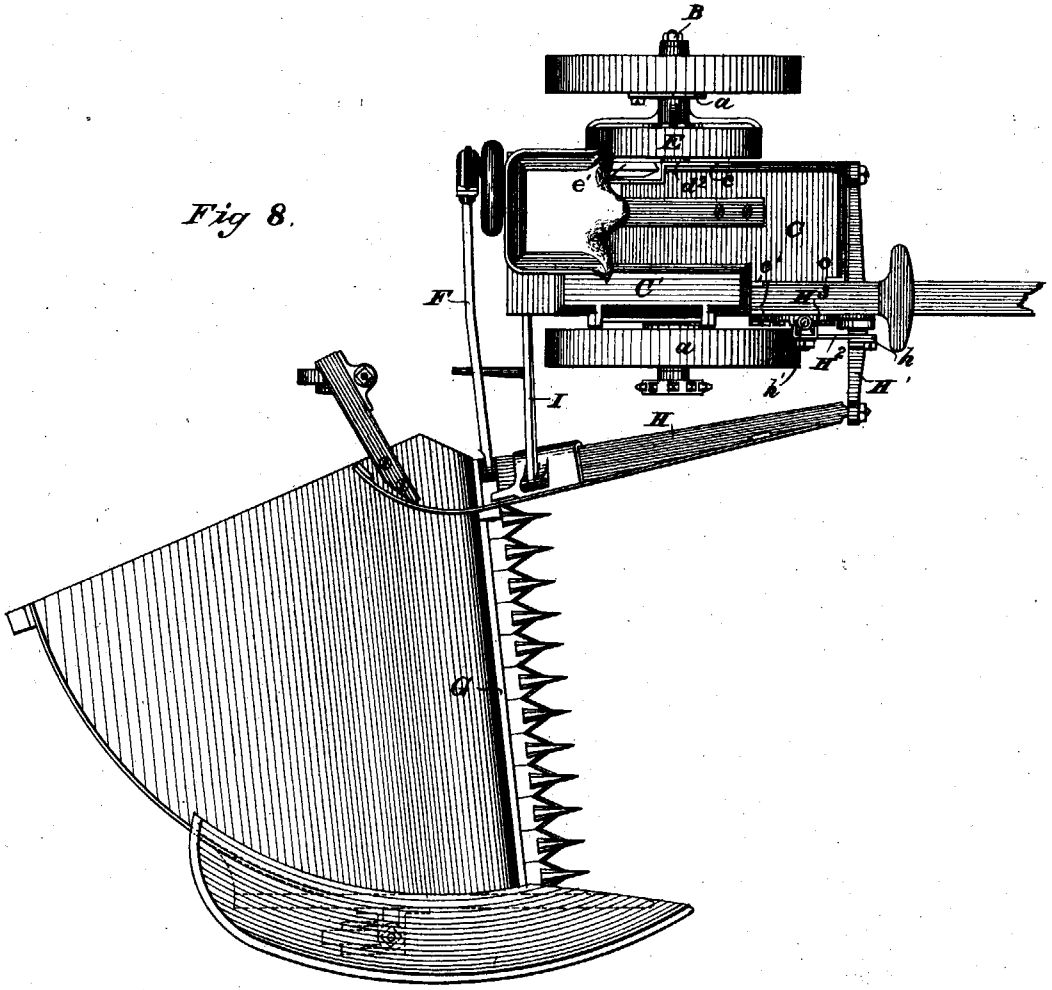
Figure 9:
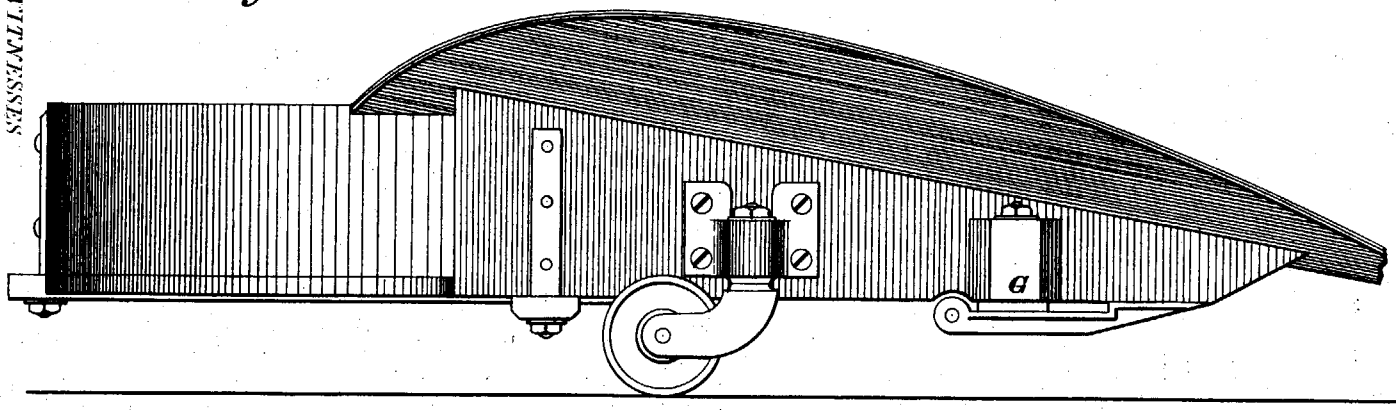
Figure 10:
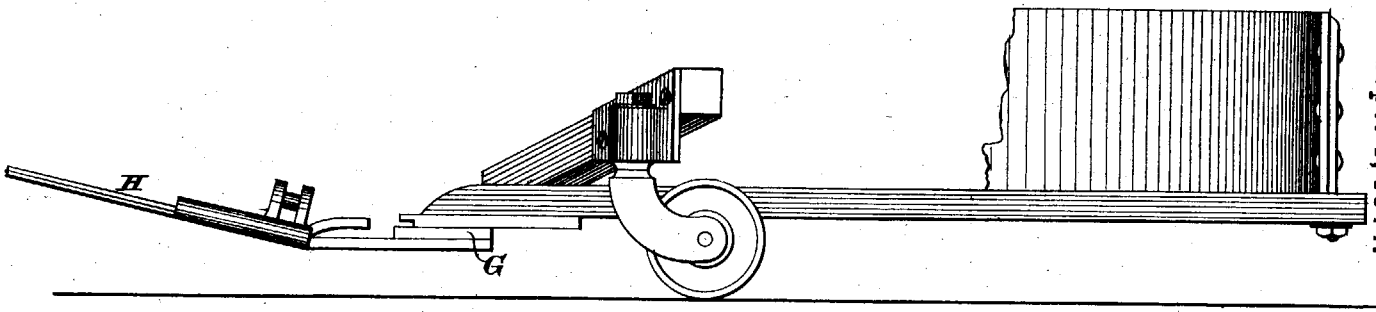

In the accompanying drawings, which show all the improvements above referred to as embodied in one machine, Figure 1 is a plan view, partly in section, through one of the main driving-wheels and the internal gear-wheel, showing the machine as arranged for mowing. Fig. 2 is a side elevation of the same, partly in section, on the line 1 1 of Fig. 1. Fig. 3 is a rear elevation thereof. Fig. 4 is a perspective view of the cast-metal main frame and journal-covers, looking from the front and left. Fig. 5 is a similar view looking from the front and right of the machine; Fig. 6, a plan view of the swivel-joint, crank, and pitman connection, partly in section, on the line 2 2 of Fig. 7; Fig. 7, a side elevation of the same, partly in section, on the line 3 3 of Fig. 6. Fig. 8 is a general plan view on a small scale of the machine, showing the grain-platform connected to the cutter-bar, thus forming a hand-raking harvester; Fig. 9, a side elevation of the grain-platform, looking from the grain side; and Fig. 10, a similar view of the same, looking from the stubble side.

In the accompanying drawings two main supporting and driving wheels are shown as mounted loosely upon an axle, B, turning in boxes or bearings on the under side of the main frame. These wheels are connected with the axle by the usual backing-ratchets *a*, in such manner that when the machine is backing the wheels turn freely upon the axle, but when the machine advances the axle turns with the wheels.

The main frame C rests upon the axle, and extends both in front and rear of the driving-wheels, in order to facilitate the connection of the cutting apparatus.

This main frame is of metal, and is cast with the following parts in one piece: a tool-box, C′, arranged longitudinally on the inner side of the main frame, serves not only to contain tools, but to brace and strengthen the frame, thus admitting of the latter being made thin and light. Directly opposite this tool-box a flange or guard, *c*, is formed upon the outer edge of the main frame, which thus not only serves to strengthen, but also serves as a guard or fender to the gearing. Lugs or flanges $c^1$, near the inner front corner of the main frame, serve as a socket for the tongue, and to strengthen the frame at a point where the greatest strain is applied, and consequently where the greatest strength is required. On the outer rear corner of the frame half-bearings *d* are formed, for the reception of a crank-shaft, $d^1$. The end of the platform may also be strengthened by ribs $c^3$. Half-boxes $d^2$ are formed on the under side of the main frame, for the reception of the main axle. A stud-shaft, *e*, for the reception of an intermediate gear-wheel, $e^1$, may be applied to the main frame in any suitable manner By thus casting the platform of one piece of metal, I am enabled to obtain a firm support for the gearing and other parts of the mechanism, and thus prevent its binding or straining. I am also enabled to use short shafts for the gear-wheels, and to drive the gearing by means of an inside gear-wheel, E, applied to the axle of the transporting-wheels.

An internally-geared spur-wheel, E, fast on the main axle, drives a spur-pinion, $e^2$, and bevel-wheel $e^1$ on the short shaft *e*, which bevel-wheel meshes with a pinion, $e^3$, on the crank-shaft $d^1$, which drives the cutters by a crank and pitman, in the usual way.

The crank-pin is provided with a ball, *f*, and a pitman-rod, F, with a corresponding socket, (see Figs. 6 and 7,) thus allowing the cutters to rock and roll freely without straining the pitman.

The inner end of the finger-beam G is rigidly secured to a drag-bar, H, extending upward and forward, and pivoted at its front end to a transverse arm or link-rod, $H^1$, which is in turn pivoted at its outer end to the outer front corner of the main frame.

The finger-beam is likewise connected with the main frame by means of a lateral brace or coupling-arm, I, pivoted at one end to the drag-bar, near the rear end thereof, and at its other end to the main frame near its outer rear corner.

The front arm or link-rod $H^1$ is connected by a link, *h*, to a crank or elbow lever, $H^2$, pivoted to a plate, $H^3$, bolted to the inner side of the main frame at or near its front corner, but between the wheels. This plate is constructed in the form of a sector, and the pivot of the lever is concentric therewith, so that its arm can be made to catch between the teeth projecting from said sector, and thus sustain the forward end of the drag-bar in any position desired. The upper arm *h′* of the lever has also a slight lateral motion on its pivot to permit it to move past the teeth, between which it is held by a slight spring, and can readily be manipulated by an attendant while occupying his seat on the main frame.

The lateral brace or coupling-arm and drag-bar allow the finger-beam to vibrate freely about their outer joints, so that either end of the finger-beam may rise or fall without correspondingly affecting the other, and the finger-beam may also be rocked or rolled in the line of its length.

A lifting-lever, J, mounted upon the inner rear corner of the main frame, and provided with a sector or detent and a spring, such as above described, is connected with the finger-beam, so that it can be raised by the attendant while on his seat. This lever is shown in the drawings as provided with a grooved sector, $J^1$, over which the lifting-chain $J^2$ passes, the lower end of the chain being attached to the coupling-arm I.

When the machine is used as a reaper, the rear lever can be detached, leaving the forward lever to enable the driver to raise and lower the cutting apparatus together with the front part of the platform, which is secured to the finger-beam in usual well-known ways, and supported upon two caster-wheels. The outer one or grain-wheel is pivoted to a vertical guard-board of the divider, and the inner one, or that next the main frame, is applied to a short beam secured to the platform near its inner front corner.

Being thus supported, the platform can be raised or lowered by means of the front rocking lever—that is to say, both the inner and outer ends of the finger-beam, and the platform, which is secured to it, will be elevated or depressed alike, neither end being allowed to sag. The axes of the caster-wheels become the fulcra about which the platform is adjusted while cutting grain.

The organization of mechanism above described is especially adapted for use in connection with a rake mounted on the inner front corner of the platform, revolving on an axis substantially vertical, and driven from the main axle by a chain; but, as other raking attachments may be used in conjunction with my machine, I will not here particularly describe the construction of the rake, the arms of which are pivoted to a crown-wheel and sweep around over the platform, then rise to a vertical position, and descend again in front of the cutting apparatus, so as to sweep the grain when cut around, and deliver it upon the ground.

It is obvious that a lever for rocking the front end of the drag-bar, arranged outside of the driving-wheel, or in rear of its axis, would be in the way of the rake and its driving mechanism, while a lever arranged transversely across the front of the main frame would be inconvenient for operation by the driver while in his seat on the machine.

The operation and advantages of my improvements will be obvious to those skilled in the art without further description.

I do not broadly claim rocking the cutting apparatus of a harvester by means of a lever applied to the front end of a drag-bar, as that is not new; but, as far as I am aware, I am the first to organize a mowing-machine with a cutting apparatus to be rocked by a lever pivoted on the main frame, in front of and between the driving-wheels, and moving parallel therewith, which organization affords obvious facilities for manipulation by the driver.

Having thus described my invention, what I claim as new, and desire to secure by Letters Patent, is—

1. The cast-metal main frame, constructed, substantially as hereinbefore set forth, in one piece, with a tool-box and flanges on its upper surface to strengthen the frame, and with recesses in its outer rear corner for the gearing.

2. In a two-wheeled hinged-bar harvester, the lifting-lever pivoted on the main frame, between the driving-wheels, (moving parallel therewith,) and in front of the axle thereof, provided with a detent, and connected with the coupling-link to which the forward end of the drag-bar is attached, these members being arranged and operating in combination, substantially as hereinbefore set forth.

3. The combination, as set forth, in a two-wheeled, hinge-bar, rear-cut harvester, of the forward lifting-lever with the rear lifting-lever, each having a separate axis and moving parallel with the wheels, whereby the ordinary adjustment is retained, and the adjustment of the pitch of the guards to suit the condition of the crop to be cut is made instantaneously by the driver from his seat on the machine without stopping it.

4. The combination, substantially as hereinbefore set forth, of two main supporting and driving wheels, a main frame mounted thereon, a finger-beam connected with the main frame by a hinged drag-bar and coupling-arm, a platform connected with said finger-beam and supported upon caster-wheels, and a rocking lever mounted upon the main frame and connected with the front end of the drag-bar, whereby the driver from his seat can raise or lower the finger-beam and platform by rocking them on the caster-wheels, without disturbing the parallelism or horizontality of either end of the cutting apparatus.

JAMES S. MARSH.

Witnesses:
WM. D. BALDWIN,
WM. J. PEYTON.